United States Patent
Sakamoto et al.

(10) Patent No.: US 12,480,866 B2
(45) Date of Patent: Nov. 25, 2025

(54) OPTICAL MEASUREMENT APPARATUS

(71) Applicants: NATIONAL UNIVERSITY CORPORATION NAGAOKA UNIVERSITY OF TECHNOLOGY, Niigata (JP); OPT GATE CO., LTD., Tokyo (JP)

(72) Inventors: Moritsugu Sakamoto, Niigata (JP); Hiroshi Ono, Niigata (JP); Kohei Noda, Niigata (JP); Masayuki Tanaka, Tokyo (JP)

(73) Assignees: NATIONAL UNIVERSITY CORPORATION NAGAOKA UNIVERSITY OF TECHNOLOGY, Nagaoka (JP); OPT GATE CO., LTD., Tokyo (JP)

(*) Notice: Subject to any disclaimer, the term of this patent is extended or adjusted under 35 U.S.C. 154(b) by 210 days.

(21) Appl. No.: 18/287,021

(22) PCT Filed: Mar. 29, 2022

(86) PCT No.: PCT/JP2022/015582
§ 371 (c)(1),
(2) Date: Oct. 16, 2023

(87) PCT Pub. No.: WO2022/220112
PCT Pub. Date: Oct. 20, 2022

(65) Prior Publication Data
US 2024/0201072 A1    Jun. 20, 2024

(30) Foreign Application Priority Data

Apr. 16, 2021 (JP) .................................. 2021-069836
Feb. 9, 2022 (JP) .................................. 2022-018897

(51) Int. Cl.
*G01N 21/21* (2006.01)
*G01J 4/04* (2006.01)

(52) U.S. Cl.
CPC ................ *G01N 21/21* (2013.01); *G01J 4/04* (2013.01); *G01N 2201/0635* (2013.01); *G01N 2201/0636* (2013.01)

(58) Field of Classification Search
CPC ... G01J 4/04; G01N 21/21; G01N 2201/0635; G01N 2201/0636
See application file for complete search history.

(56) References Cited

FOREIGN PATENT DOCUMENTS

| CN | 111208067 A | 5/2020 |
|---|---|---|
| JP | 201952857 A | 4/2019 |

(Continued)

*Primary Examiner* — Mark R Gaworecki
(74) *Attorney, Agent, or Firm* — Li & Cai Intellectual Property Office

(57) ABSTRACT

Provided is an optical measurement apparatus including: a polarized light irradiation unit 10 that irradiates a subject Ob with irradiation light of which polarization is controlled; and a polarization imaging unit 20 that images a polarization state of measurement light occurring due to scattering or the like of the irradiation light by the subject Ob, calculates Stokes parameters of the measurement light, and measures a variation of a polarized component occurring between the irradiation light and the measurement light. Since the subject is irradiated with irradiation light of which a polarization state is controlled, it is possible to acquire subject information that is difficult to measure in a case of irradiating the subject with natural light, and it is also possible to suppress noise or the like that occurs when measuring polarization by irradiating the subject with irradiation light of which a polarization state is unstable.

7 Claims, 12 Drawing Sheets

(56) References Cited

FOREIGN PATENT DOCUMENTS

| | | |
|---|---|---|
| JP | 2019100862 A | 6/2019 |
| JP | 2020204539 A | 12/2020 |
| WO | WO2019147828 A1 | 8/2019 |

OPTICAL MEASUREMENT APPARATUS

FIELD OF THE DISCLOSURE

The present invention relates to an optical measurement device apparatus that performs irradiation with polarized irradiation light, measures polarization of measurement light from a subject, and measures a variation of a polarized component.

BACKGROUND OF THE DISCLOSURE

In the related art, optical measurement has been used in a wide range of fields as technologies capable of measuring information or characteristics of a subject in a non-contact and non-destructive manner, but the majority thereof are technologies of measuring intensity or a wavelength of light. On the other hand, in recent years, interest has been focused on characteristics derived from an internal structure such as anisotropy of materials and characteristics of biological cells, and as a method of acquiring the characteristics, measurement of a polarization state of light that is subjected to scattering, reflection, absorption, and the like by a subject has been suggested.

As a representative measurement method of measuring the polarization state, there is known a rotating polarizer method using a rotating polarizer and a wavelength plate. However, since information necessary for calculating Stokes parameters is acquired a plurality of times while rotating the polarizer, it is difficult to perform measurement on a dynamic subject or a subject of which a polarization state varies temporally.

Here, as a method of measuring a polarization spatial distribution with a snapshot with respect to the subject of which the polarization state varies dynamically or temporally, a measurement method using a polarizer array camera or polarization diffraction gratings, and the like have been devised.

PTL 1 discloses a polarization imaging device including an imaging lens, a color filter, an anisotropic diffraction grating element, and a light-receiving element array. Incident light subjected to scattering, reflection, absorption, and the like by a subject is diffracted depending on a polarization state when being transmitted through the anisotropic diffraction grating element. When respective spatially separated diffracted light beams of the incident light are received by the light-receiving element array, polarization information of the incident light can be acquired as intensity information in a spatially separated manner.

Stokes parameters S0, S1, S2, and S3 which are elements of Stokes vectors S (S0, S1, S2, and S3) describing a polarization state are calculated from intensity information of the respective separated diffraction order light beams. The respective elements of the Stokes vectors S are defined as follows. Specifically, S0 is defined as a total optical intensity, S1 is defined as a difference in optical intensity between a 0° linearly polarized component and a 90° linearly polarized component, S2 is defined as a difference in optical intensity of a 45° linearly polarized component and a 135° linearly polarized component, S3 is defined as a difference in optical intensity between a right-handed circularly polarized component and a left-handed circularly polarized component, and the respective elements also correspond to measurement of S3 that is difficult to measure with a polarizer array camera.

PTL 1: WO2019/039486

SUMMARY OF THE DISCLOSURE

In the above-described polarization measurement method and polarization imaging device, under natural light such as sunlight and indoor environmental light (a fluorescent lamp or an incandescent lamp), that is, non-polarized environmental light, a polarization state of measurement light occurring due to scattering, reflection, absorption, or the like by a subject is measured to calculate the Stokes parameters S0, S1, S2, and S3. However, since the Stokes vectors S (S0, S1, S2, and S3) of the non-polarized environmental light are (1, 0, 0, and 0), and do not include a linearly polarized component and a circularly polarized component, only a variation of a polarization state which is caused by Fresnel reflection or scattering on a surface of the subject can be measured, there is a problem that it is difficult to measure a variation of the polarization state which is caused by birefringence, circular dichroism, linear dichroism, scattering, multiple-interference, and the like at the inside of the subject.

In addition, even though the environmental light is not non-polarized light, in a case where a polarization state is not controlled, there is also a problem that a speckle noise with respect to a phase fluctuation such as coherent light occurs, or it is difficult to measure the polarization state under an environment in which snow, rain, fog, or the like exists, that is, under an environment in which a scattering factor exists.

An object of the invention is to solve the above-described problems and to provide an optical measurement apparatus that irradiates a subject with irradiation light of which a polarization state is controlled, and measures a variation of a polarization state of measurement light occurring due to scattering, reflection, absorption, and the like by the subject to acquire subject information.

To accomplish the above-described object, according to the invention, there is provided an optical measurement apparatus including: a polarized light irradiation unit that irradiates a subject with irradiation light of which polarization is controlled; and a polarization imaging unit that images a polarization state of measurement light occurring by irradiating the subject with the irradiation light, and measures a variation of a polarized component occurring between the irradiation light and the measurement light. The irradiation light is partially polarized light having a degree of polarization of 50 to 100% or fully polarized light, and ellipticity of the fully polarized component is 50 to 100%. The polarization imaging unit includes a polarization imaging mechanism that is capable of calculating, on the basis of a difference between two images including a right-handed circularly polarized component and a left-handed circularly polarized component, at least an element of Stokes parameters which represents a difference between optical intensities of these polarized components among Stokes parameters of the subject. The polarization imaging mechanism includes a polarization diffraction grating that spatially separates the incident measurement light into a left-handed circularly polarized component and a right-handed circularly polarized component, and performs calculation of the element of Stokes parameter which represents the difference in optical intensity of the polarized components from a snapshot captured by imaging the subject with a wavelength of 900 nm or more.

According to the optical measurement apparatus according to the invention, subject information unique to a subject can be acquired by measuring a variation of a polarized component occurring between irradiation light of which polarization is controlled and which illuminates the subject by a polarized light irradiation unit, and measurement light occurring due to scattering, reflection, absorption, and transmission by the subject and is imaged by the polarization imaging unit.

DETAILED DESCRIPTION OF THE EXEMPLARY EMBODIMENTS

The invention will be described in detail on the basis of illustrated examples.

Example 1

Figure 1:
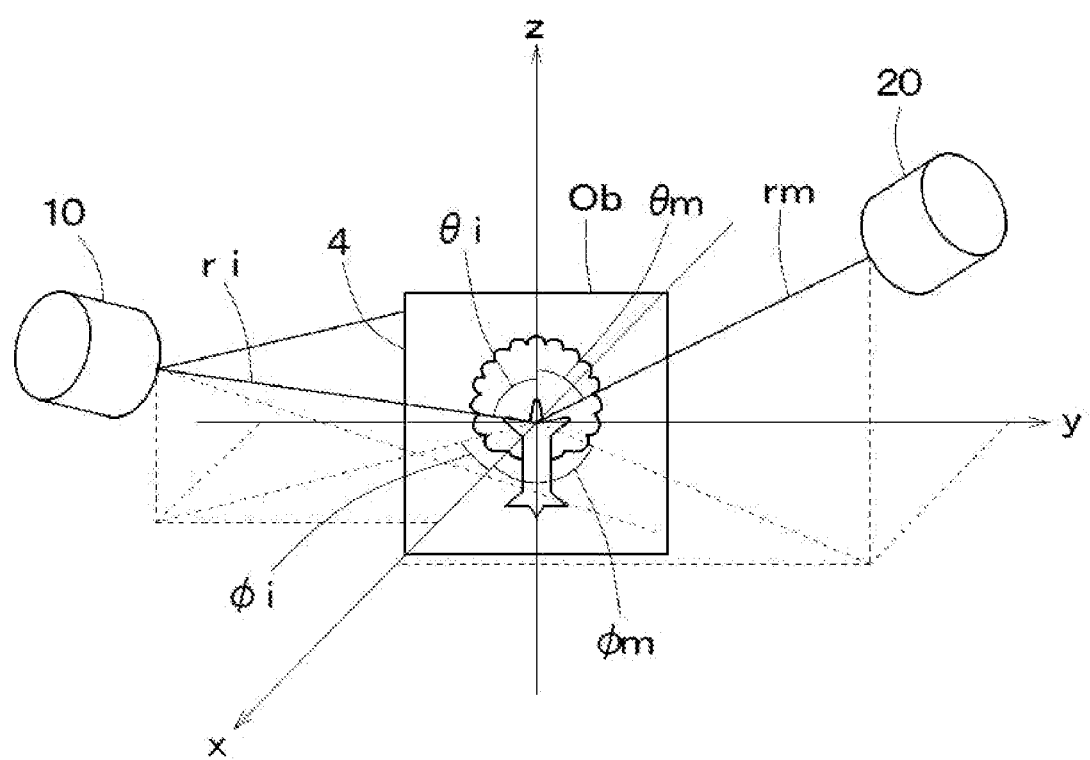
FIG. 1 is a configuration diagram of Example 1 of an optical measurement apparatus.

FIG. 1 is a configuration diagram of Example 1 of an optical measurement apparatus, and the optical measurement apparatus includes a polarized light irradiation unit 10 that is movably provided at a position $ri=(ri \cdot \sin \theta i \cdot \cos \varphi i, ri \cdot \sin \theta i \cdot \sin \varphi i, ri \cdot \cos \theta i)$ expressed by a polar coordinate system, and a polarization imaging unit 20 that is movably provided at a position $rm=(rm \cdot \sin \theta m \cdot \cos \varphi m, rm \cdot \sin \theta m \cdot \sin \varphi m, rm \cdot \cos \theta m)$ expressed by polar coordinate system with respect to a subject Ob disposed on a yz plane. However, r represents a central position of the subject Ob, that is, a distance from the origin of the polar coordinate system, $\theta$ represents a deflection angle from a z-axis, and $\varphi$ represents a deflection angle from an x-axis. A movable range of the polarized light irradiation unit 10 is set to $0 \le ri$, $0 \le \theta i < 180°$, and $0 \le \varphi i < 360°$, and a movable range of the polarization imaging unit 20 is set to $0 \le rm$, $0 \le \theta m < 180°$, and $0 \le \varphi m < 360°$.

The polarized light irradiation unit 10 has a function of irradiating the subject Ob with irradiation light LS of which polarization is controlled after two-dimensional scanning or expansion of the irradiation light LS. The polarization imaging unit 20 has a function of imaging a polarization state of the measurement light LR occurring due to scattering, reflection, absorption, and the like of the irradiation light LS by the subject Ob, calculating all or a part of Stokes parameters S0 to S3 of the measurement light LR, and measuring a variation of a polarized component occurring between the irradiation light LS and the measurement light LR due to the subject Ob. Note that, the variation of the polarized component varies uniquely for every subject Ob.

In FIG. 1, an arrangement is made so that the measurement light LR occurring when the irradiation light LS emitted from the polarized light irradiation unit 10 is reflected from the subject Ob is imaged by the polarization imaging unit 20. However, the arrangement of the polarized light irradiation unit 10 and the polarization imaging unit 20 can be arbitrarily changed in correspondence with which measurement light LR occurring due to scattering, reflection, transmission, or the like as a result of irradiation of the subject Ob with the irradiation light LS will be imaged with the polarization imaging unit 20. For example, in a case where symbols of X-coordinates of the polarized light irradiation unit 10 and the polarization imaging unit 20 are the same as each other, the arrangement is made to image reflection light occurring as a result of irradiation of the subject Ob with the irradiation light LS, and in a case where the symbols of the X coordinates are different from each other, the arrangement is made to image transmission light occurring as a result of irradiation of the subject Ob with the irradiation light LS. In a case of imaging scattering light occurring as a result of irradiation of the subject Ob with the irradiation light LS, the polarized light irradiation unit 10 and the polarization imaging unit 20 are arranged at appropriate positions corresponding to a scattering phenomenon.

Figure 2:
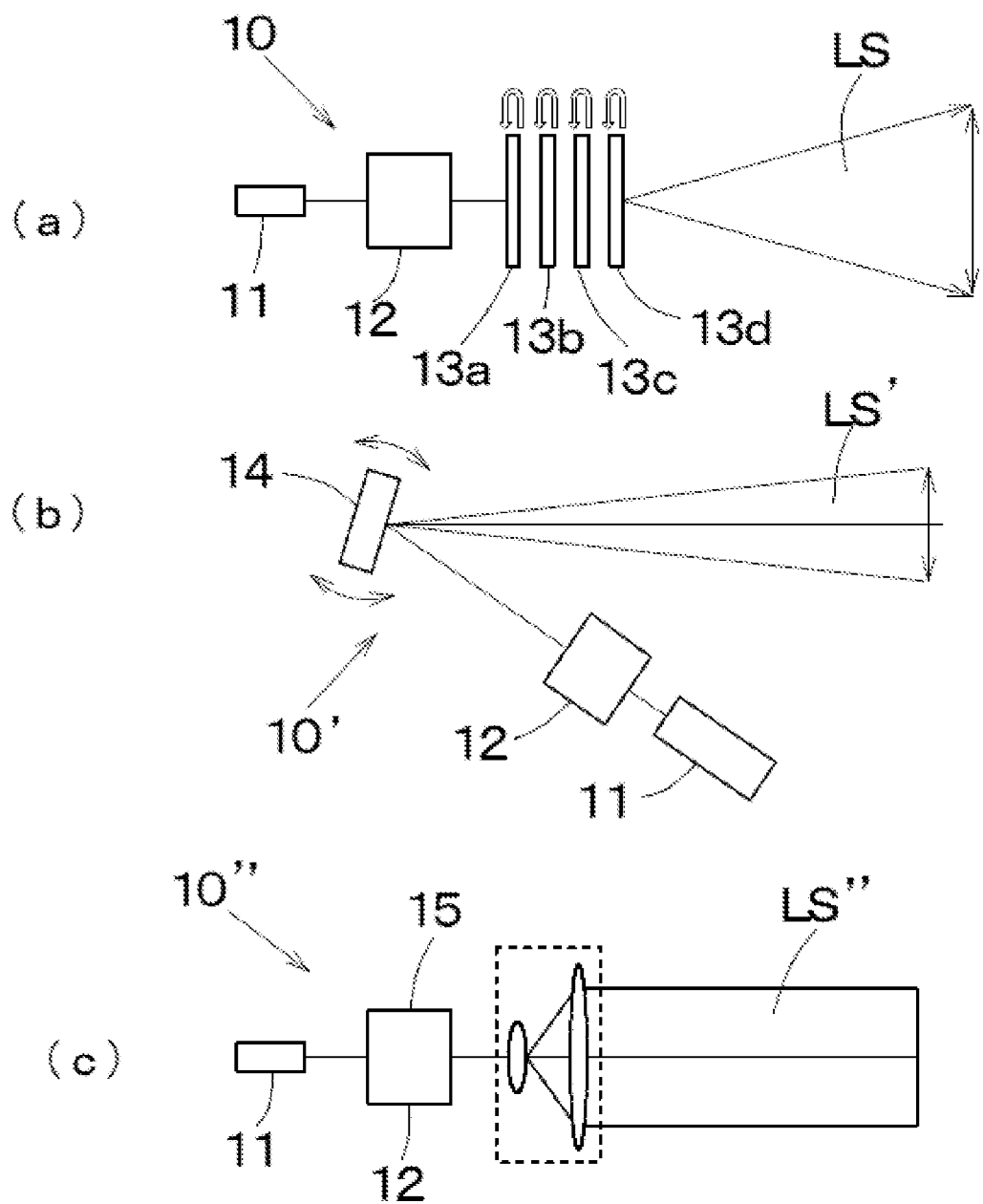
FIG. 2A is a configuration diagram of a polarized light irradiation unit using a polarization diffraction grating.
FIG. 2B is a configuration diagram of a polarized light irradiation unit using a MEMS mirror.
FIG. 2C is a configuration diagram of a polarized light irradiation unit using an enlargement irradiation optical system.

FIG. 2A to FIG. 2C are configuration diagrams of the polarized light irradiation unit 10, FIG. 2A illustrates a configuration of a first polarized light irradiation unit 10 using a polarization diffraction grating, FIG. 2B illustrates a configuration of a second polarized light irradiation unit 10' using a MEMS mirror, and FIG. 2C illustrates a configuration of a third polarized light irradiation unit 10" using an enlargement irradiation optical system.

In the first polarized light irradiation unit 10, a light source 11, a polarization control element 12, and four polarization diffraction gratings 13a to 13d including a rotary mechanism are sequentially arranged on the same optical axis. The light source 11 is not particularly limited to a laser, an LED, or the like, and it is preferable to use a product in which a frequency width of the irradiation light LS that is emitted is 1 PHz or less, more preferably 1 THz or less, still more preferably 1 GHz or less, and further still more preferably 1 MHz or less.

In addition, with regard to the irradiation light LS of the light source 11, a frequency band at which the irradiation light LS intrudes into the subject Ob and a polarization state varies in correspondence with internal information of the subject is preferable, and a frequency band from visible light to infrared light is more preferable. As long as the polarization control element 12 has a function of arbitrarily changing the polarization state of the irradiation light LS emitted from the light source 11, a shape or a configuration of the polarization control element 12 is not particularly limited, and for example, the polarization control element 12 may be configured in combination of a polarization plate and a ¼ wavelength plate, or an electro-optical modulator can also be used.

Although detailed optical characteristics will be described later, the four polarization diffraction gratings 13a to 13d have the same structure, and have the following function. Specifically, when the irradiation light LS controlled into circularly polarized light is incident, the polarization diffraction gratings 13a to 13d diffract the irradiation light LS only in a specific-order direction with diffraction efficiency of 100%. At this time, the irradiation light LS that is incident to one polarization diffraction grating and is diffracted becomes circularly polarized light in a direction opposite to a direction at the time of incidence, and ellipticity $\varepsilon$ thereof theoretically becomes 100%. In addition, each of the four polarization diffraction gratings 13a to 13d includes the rotary mechanism that is individually rotatable with an optical axis of the first polarized light irradiation unit 10 set as a central axis, and when being appropriately rotated, polarization diffraction gratings 13a to 13d can perform two-dimensional scanning with the incident irradiation light LS in a plane orthogonal to the optical axis, for example, along a Lissajous's figure or a raster figure.

In the first polarized light irradiation unit 10 configured as described above, when the irradiation light LS emitted from the light source 11 becomes circularly polarized light through the polarization control element 12 and is incident to the polarization diffraction gratings 13a to 13d, the irradiation light LS becomes circularly polarized light with excessively high accuracy, for example, fully polarized light or partially polarized light having a degree of polarization of 50 to 100%, and is subjected to two-dimensional scanning by rotation of the polarization diffraction gratings 13a to 13d to illuminate the subject Ob. In a case where the circularly polarized irradiation light LS that is subjected to the two-dimensional scanning and illuminates the subject Ob is the fully polarized light, ellipticity is preferably 50 to 100%, and in a case where the irradiation light LS is the partially polarized light, the ellipticity $\varepsilon$ and the degree of polarization p are desirably $\varepsilon > 50\%$ and $p > 50\%$, preferably $\varepsilon > 80\%$ and $p > 80\%$, more preferably $\varepsilon > 90\%$ and $p > 90\%$, and still more preferably $\varepsilon > 98\%$ and $p > 98\%$.

Note that, an example using the four polarization diffraction gratings 13a to 13d is illustrated in FIG. 2A, but two or more polarization diffraction gratings may be used in the two-dimensional scanning with the irradiation light LS. In addition, an additional polarization control element may be disposed at a rear stage of the polarization diffraction gratings 13a to 13d so as to adjust the polarization state of the irradiation light LS that is diffracted by the polarization diffraction gratings 13a to 13d.

The second polarized light irradiation unit 10' illustrated in FIG. 2B can also be used instead of the first polarized light irradiation unit 10. The second polarized light irradiation unit 10' has a configuration in which the polarization diffraction gratings 13a to 13d are substituted with a MEMS mirror 14, and a light source 11 and a polarization control element 12 are the same as in the first polarized light irradiation unit 10. The MEMS mirror 14 is movably disposed to perform two-dimensional scanning by reflecting irradiation light LS'. The polarization control element 12 can be disposed at a rear stage of the MEMS mirror 14. In addition, a condensing lens can be disposed at a front stage of the MEMS mirror 14 to reduce a beam diameter of the irradiation light LS' that is used in scanning and illumination of the subject Ob.

Although being arranged on the same optical axis, the light source 11, the polarization control element 12, and the MEMS mirror 14 constitute a reflection optical system. Accordingly, when considering only an optical system, the second polarized light irradiation unit 10' tends to be larger than the first polarized light irradiation unit 10. However, the plurality of polarization diffraction gratings 13a to 13d and the rotary mechanisms which individually rotate the gratings as in the first polarization irradiation unit 10 are unnecessary, and thus there is an advantage that a mechanism that performs scanning with irradiation light can be simplified. There is a possibility that a polarization state of the irradiation light LS' may vary due to reflection by the MEMS mirror 14, but the polarization state can be adjusted by disposing the polarization control element 12 at a rear stage of the MEMS mirror 14, or by disposing an additional polarization control element.

Accordingly, an appropriate polarized light irradiation unit 10 should be selected in correspondence with a use environment and a measurement target, and it is considered that, for example, the first polarized light irradiation unit 10 is selected when priority is given to a reduction in size of an optical system, and the second polarized light irradiation unit 10' is selected when priority is given to a reduction in the number of optical members or simplification of rotary mechanisms.

The third polarized light irradiation unit 10" illustrated in FIG. 2C can also be used instead of the first polarized light irradiation unit 10. The third polarized light irradiation unit 10" has a configuration in which the polarization diffraction gratings 13a to 13d are substituted with a lens pair 15, and a light source 11 and a polarization control element 12 are the same as in the first polarized light irradiation unit 10. The lens pair 15 is constituted by a first lens that two-dimensionally expands irradiation light LS", and a second lens that converts the irradiation light LS" into parallel light or diffused light. In the third polarized light irradiation unit 10", the irradiation light LS" is expanded without two-dimensional scanning, and the irradiation light LS" illuminates the subject Ob as parallel light or diffused light. Since the movable members such as the polarization diffraction gratings 13a to 13d and the MEMS mirror 14 are not used, there is an advantage for a reduction in size of an apparatus. Since the optical system does not perform two-dimensional scanning with the irradiation light LS", in a case of using a coherent light source as the light source 11, there is a possibility that a temporally unstable speckle noise such as a phase fluctuation may occur. In a case of using an incoherent light source, directivity is lost, and there is a possibility that an irradiation distance up to the subject Ob may be restricted.

Accordingly, from the viewpoint of illuminating a subject with stable irradiation light, the first polarized light irradiation unit 10 is superior to the third polarized light irradiation unit 10".

Note that, the polarized light irradiation unit 10 is not limited to the configurations illustrated in FIG. 2A to FIG. 2C, and may include the light source 11, a polarization control unit that controls polarization of irradiation light emitted from the light source 11, and a unit that performs two-dimensional scanning with irradiation light or expands the irradiation light. For example, a method in which a polarization diffraction grating and a variable retarder are stacked in a multi-stage to perform beam steering can be used instead of two or more polarization diffraction gratings including a rotary mechanism as in the first polarized light irradiation unit 10. In this method, it should be noted that an exposure density of the irradiation light is lower in comparison to the first polarized light irradiation unit 10.

Figure 3:
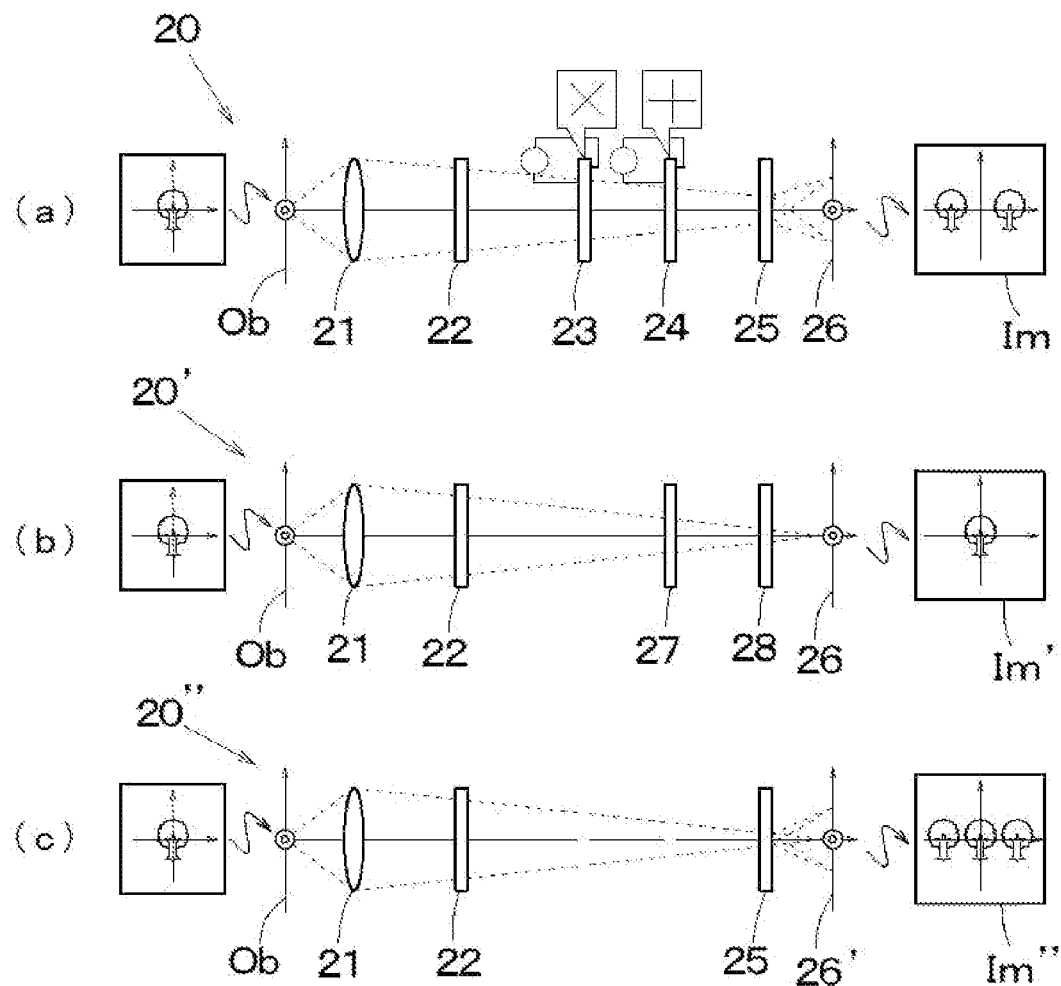
FIG. 3A is a configuration diagram of a polarization imaging unit using a polarization diffraction grating and a liquid crystal retarder.
FIG. 3B is a configuration diagram of a polarization imaging unit using a phase element and an analyzer.
FIG. 3C is a configuration diagram of a polarization imaging unit using a polarization diffraction grating and a polarizer array camera.

FIG. 3A to FIG. 3C are configuration diagrams of the polarization imaging unit 20, FIG. 3A is a configuration diagram of a first polarization imaging unit 20 that uses a polarization diffraction grating and a liquid crystal retarder, FIG. 3B is a configuration diagram of a second polarization imaging unit 20' that uses a phase element and an analyzer, and FIG. 3C is a configuration diagram of a third polarization imaging unit 20" that uses a polarization diffraction grating and a polarizer array camera.

In the first polarization imaging unit 20, an imaging lens 21, a band-pass filter 22, a first liquid crystal retarder 23, a second liquid crystal retarder 24, a polarization diffraction grating 25, and an imaging element 26 are sequentially arranged on the same optical axis from a subject Ob side. The imaging lens 21 is an optical system that images the measurement light LR from the subject Ob onto the imaging element 26, and can also be disposed at a rear stage of the polarization diffraction grating 25. The band-pass filter 22 is a filter that converts the measurement light LR into monochromatic measurement light and can also be disposed at a rear stage of the liquid crystal retarders 23 and 24. In addition, in a case where the measurement light LR is converted into monochromatic measurement light such as laser light, an edge-pass filter 22' can also be used instead of the band-pass filter 22. For example, in a case where the measurement light LR is near infrared light with a wavelength of approximately 1 μm, when using the edge-pass filter 22' that shields light with a wavelength of 900 nm or shorter, the measurement light LR from which a noise due to external environment light is excluded can be imaged onto the imaging element 26.

When assuming that a horizontal direction of the imaging element 26 is a 0° direction, a fast axis of the first liquid crystal retarder 23 is set to 45°, a fast axis of the second liquid crystal retarder 24 is set to 0°, and a phase difference is variable in a range of 0 to $2\pi$ or more with respect to a wavelength of the measurement light LR. In addition, the first liquid crystal retarder 23 and the second liquid crystal retarder 24 operate to temporally change a phase difference applied to the measurement light LR by the first liquid crystal retarder 23 and the second liquid crystal retarder 24 so as to convert polarization into the following three states.

(1) Conversion of 0° and 90° linearly polarized components into left-handed circularly polarized light and right-handed circularly polarized light
(2) Conversion of 45° and 135° linearly polarized components into left-handed circularly polarized light and right-handed circularly polarized light
(3) Without conversion of polarization Although specific optical characteristics will be described later, when the measurement light LR is incident to the polarization diffraction grating 25, the polarization diffraction grating 25 has a function of diffracting left-handed and right-handed circularly polarized components only in specific-order individual directions with diffraction efficiency of 100% for spatial separation into the left-handed circularly polarized component and the right-handed circularly polarized component. The imaging element 26 captures and detects two images of the measurement light LR which are separated by the polarization diffraction grating 25. In addition, it is preferable that the imaging element 26 can detect the measurement light LR from the inside of the subject Ob, and it is more preferable that the imaging element 26 can detect a frequency band range from visible light to infrared light.

In the first polarization imaging unit 20 configured as described above, the measurement light LR from the subject Ob is imaged onto the imaging element 26 transmitting through the imaging lens 21, is converted into monochromatic measurement light with the band-pass filter 22, and is sequentially incident to the first liquid crystal retarder 23 and the second liquid crystal retarder 24. Since the first liquid crystal retarder 23 and the second liquid crystal retarder 24 operate in three states which can be temporally changed, and sequentially perform conversion including (1) conversion of 0° and 90° linearly polarized components into left-handed circularly polarized light and right-handed circularly polarized light, (2) conversion of 45° and 135° linearly polarized components into left-handed circularly polarized light and right-handed circularly polarized light, and (3) without conversion of polarization with respect to the measurement light LR, the left-handed and right-handed circularly polarized components of the measurement light LR are spatially separated into two pieces by the polarization diffraction grating 25, and are imaged on the imaging element 26 as two images.

The imaging element 26 captures two separated images of the measurement light LR, and can temporally and sequentially switch the images into (1) 0° and 90° linearly polarized components which are converted into left-handed circularly polarized light and right-handed circularly polarized light, (2) 45° and 135° linearly polarized components which are converted into left-handed circularly polarized light and right-handed circularly polarized light, and (3) a right-handed circularly polarized component and a left-handed circularly polarized component. When calculating a difference of the two images which are sequentially switched from (1) to (3), a Stokes parameter S1 can be calculated from (1), a Stokes parameter S2 can be calculated from (2), and a Stokes parameter S3 can be calculated from (3) in a sequential manner, and a Stokes parameter S0 can be calculated by obtaining the sum of the two images from any of (1) to (3).

A second polarization imaging unit 20' illustrated in FIG. 3B can also be used instead of the first polarization imaging unit 20. The second polarization imaging unit 20' has a configuration in which the first liquid crystal retarder 23, the second liquid crystal retarder 24, and the polarization diffraction grating 25 are substituted with a phase element 27 and an analyzer 28, and an imaging lens 21 and a band-pass filter 22 are the same as in the first polarization imaging unit 20. The phase element 27 is rotatably disposed with the optical axis set as a central axis so as to obtain light corresponding to a polarization state from measurement light LR'.

In the second polarization imaging unit 20', imaging necessary for calculating Stokes parameters is performed a plurality of times while rotating the phase element 27 and the analyzer 28, and at least four captured images are necessary for calculating all elements of the Stokes parameters. In addition, since a mechanical drive unit for rotating the phase element 27 and the analyzer 28 is necessary, an apparatus size tends to increase.

Accordingly, from the viewpoint of time required for calculating all elements of the Stokes parameters and the apparatus size, the first polarization imaging unit 20 is superior to the second polarization imaging unit 20'. Note that, all technologies relating to a known rotary phase element method or a known rotary polarizer method can be used in the second polarization imaging unit 20', and measurement accuracy can also be increased.

A third polarization imaging unit 20" illustrated in FIG. 3C can also be used instead of the first polarization imaging unit 20. The third polarization imaging unit 20" has a configuration in which the first liquid crystal retarder 23 and the second liquid crystal retarder 24 in the first polarization imaging unit 20 are not used, and a polarization array camera is used as an imaging element 26'. An imaging lens 21, a band-pass filter 22, and a polarization diffraction grating 25 are the same as in the first polarization imaging unit 20.

In the third polarization imaging unit 20", all elements of the Stokes parameters are calculated by combining a function of diffracting circularly polarized light of the measurement light LR" and spatially separating the circularly polarized light by the polarization diffraction grating 25, and a function of imaging a linearly polarized component by the polarizer array camera that is the imaging element 26'. For example, in a case where the polarization diffraction grating 25 diffracts left-handed circularly polarized light and right-handed circularly polarized light of the measurement light LR" into positive first-order light and negative first-order light, the Stokes parameters S0, S1, and S2 can be calculated from zero-order light of the measurement light LR" transmitted through the polarization diffraction grating 25, and S3 can be calculated from a difference between the positive first-order light and the negative first-order light. That is, when using the third polarization imaging unit 20", all Strokes parameters can be calculated from one captured image.

However, since a pixel size of the polarizer array camera becomes two times a pixel size of a typical camera that is used as the imaging element 26 of the first polarization imaging unit 20, resolution of the captured image is lowered. In addition, since an extinction ratio of a polarizer array that is used in the polarizer array camera is small in an infrared wavelength band, it is difficult to use the polarizer array camera in polarization imaging in the infrared wavelength band from the viewpoint of measurement accuracy. Furthermore, the polarizer array camera is expensive for use as the imaging element 26'. Accordingly, from the viewpoints of the resolution, the manufacturing cost, and coping with the infrared wavelength band, the first polarization imaging unit 20 is superior to the third polarization imaging unit 20".

Note that, as the polarization imaging unit 20, all existing technologies can be employed as long as a spatial distribution of the polarization state of the measurement light LR from the subject Ob can be imaged without limitation to the configurations illustrated in FIG. 3A to FIG. 3C.

Figure 4:
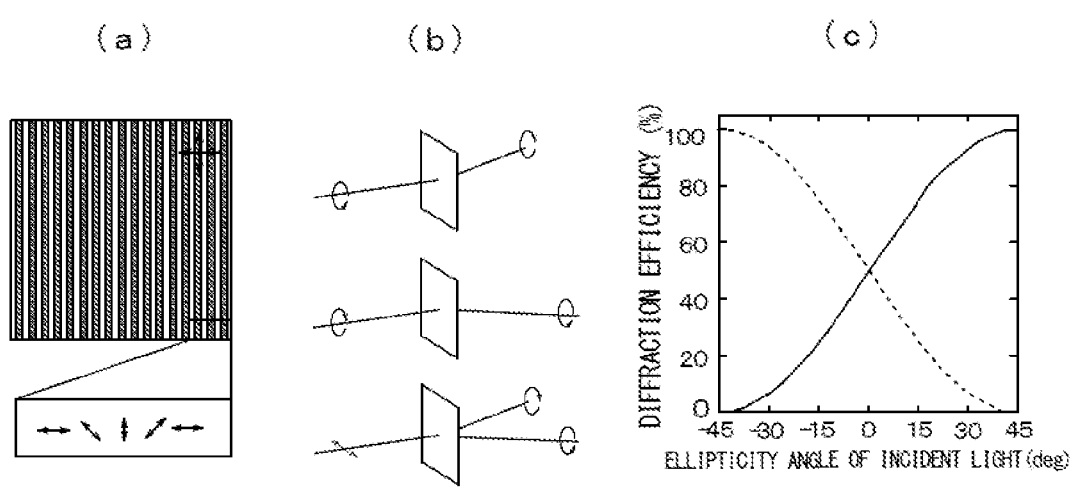
FIG. 4A is an explanatory view of optical characteristics of optical anisotropy of the polarization diffraction grating.
FIG. 4B is an explanatory view of optical characteristics of diffraction characteristics of the polarization diffraction grating.
FIG. 4C is an explanatory view of optical characteristics of diffraction efficiency of the polarization diffraction grating.

FIG. 4A to FIG. 4C are explanatory views of optical characteristics of the polarization diffraction gratings 13a to 13d in the polarized light irradiation unit 10 and the polarization diffraction grating 25 in the polarization imaging unit 20. FIG. 4A illustrates optical anisotropy, FIG. 4B illustrates diffraction characteristics, and FIG. 4C illustrates diffraction efficiency. The polarization diffraction gratings 13a to 13d and the polarization diffraction grating 25 have the same optical characteristics except that the polarization diffraction gratings 13a to 13d include the rotary mechanism.

As illustrated in FIG. 4A, the polarization diffraction gratings 13a to 13d and 25 are diffractive optical elements in which optical axes are periodically distributed within an element plane. As illustrated in FIG. 4B, the polarization diffraction gratings 13a to 13d and 25 have the following functions. Specifically, at the time of conditions in which a phase difference of $\pi$ occurs with respect to a wavelength of incident light, right-handed circularly polarized light is diffracted to a positive first-order optical direction with diffraction efficiency of 100% when left-handed circularly polarized light is incident to the polarization diffraction gratings 13a to 13d and 25, left-handed circularly polarized light is diffracted to negative first-order optical direction with diffraction efficiency of 100% when right-handed circularly polarized light is incident thereto, and linearly polarized light is separated into left-handed circularly polarized light and right-handed circularly polarized light with diffraction efficiency of 50%. That is, diffraction efficiency of the polarization diffraction gratings 13a to 13d and 25 for the positive first-order light and the negative first-order light has characteristics shown in FIG. 4C with respect to ellipticity of the incident light, and the polarization diffraction gratings 13a to 13d and 25 can spatially separate and diffract the left-handed circularly polarized light and the right-handed circularly polarized light.

Note that, in correspondence with the optical axis distribution of the polarization diffraction gratings 13a to 13d and 25, it is also possible to exhibit a function of diffracting the left-handed circularly polarized light to the positive first-order direction when right-handed circularly polarized light is incident, and diffracting the right-handed circularly polarized light to the negative first-order direction when left-handed circularly polarized light is incident. In addition, it is not necessary that the directions to which the left-handed circularly polarized light and the right-handed circularly polarized light are spatially separated and diffracted are set to the positive first-order and the negative first-order as long as the order is a specific order.

The polarization diffraction gratings 13a to 13d and 25 having the above-described optical characteristics include a polarization-sensitive recording material, and are prepared by recording a polarization hologram. At this time, a polarization orientation of irradiation light and an orientation of optical anisotropy corresponding to polarization ellipticity, that is, a direction of an optical axis and the magnitude of birefringence are recorded on the recording material.

The recording material included in the polarization diffraction gratings 13a to 13d and 25 is composed of photoreactive polymer film, and is preferably a liquid crystal polymer film. In addition, the polarization diffraction gratings 13a to 13d and 25 are preferably set as liquid crystal cell type polarization diffraction gratings in which the liquid crystal polymer film is formed, for example, in a glass cell or the like and is sealed.

As the optical measurement apparatus of Example 1 configured as described above, the irradiation light LS emitted from the polarized light irradiation unit 10 becomes circularly polarized light with high ellipticity and a high degree of polarization, is subjected to two-dimensional scanning or two-dimensional expansion, and illuminates all over the subject Ob from various directions. When the irradiation light LS is subjected to scattering, reflection, absorption, transmission, and the like by the subject Ob, the measurement light LR occurs. The polarization imaging unit 20 measures the measurement light LR from various directions through spatially separated imaging in correspondence with a polarization state, or a plurality of times of imaging corresponding to the polarization state, and calculates all elements of the Stokes parameters. At this time, a relationship between Stokes vector S of the irradiation light LS and Stokes vector S' of the measurement light LR is expressed by the following Expression (1) in accordance with Muller matrix M.

[Mathematical Formula 1]

$$S' = MS = \begin{pmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{pmatrix} \begin{pmatrix} S_0 \\ S_1 \\ S_2 \\ S_3 \end{pmatrix} \quad (1)$$

Since the polarized light irradiation unit 10 can illuminate the subject Ob with the irradiation light LS that is circularly polarized light having high ellipticity and a high degree of polarization, and the polarization imaging unit 20 can calculate all Stokes parameters, it is possible to obtain the Stokes vector S' including information of a total of eight elements in a first column and a fourth column of the Muller matrix M in Expression (1). The Stokes vector S' includes optical activity, birefringence, and the like, and thus information relating to optical anisotropy of the subject Ob can be acquired in more detail.

In addition, since circularly polarized light does not have a polarization orientation in comparison to linearly polarized light, physical property information of the subject Ob can be acquired in a more isotropic manner in comparison to the linearly polarized light. That is, since the circularly polarized light has sensitivity as long as the optical axis does not face a propagation direction, and is converted into elliptically polarized light having a polarization orientation in a direction corresponding to an orientation of the optical axis, a spatial distribution of anisotropy of the subject Ob can be directly visualized from a measured polarization spatial distribution.

On the other hand, in the linearly polarized light, when the polarization orientation and an optical axis of anisotropy are parallel or orthogonal to each other, sensitivity is lost. Therefore, in a case of visualizing the spatial distribution of anisotropy, the linearly polarized light has a disadvantage in terms of the amount of information. Note that, in non-polarized illumination in the related art, Stokes parameters S1, S2, and S3 are 0, and sensitivity to anisotropy is absent. Therefore, it is difficult to visualize information such as birefringence and optical activity of a subject.

Figure 5:
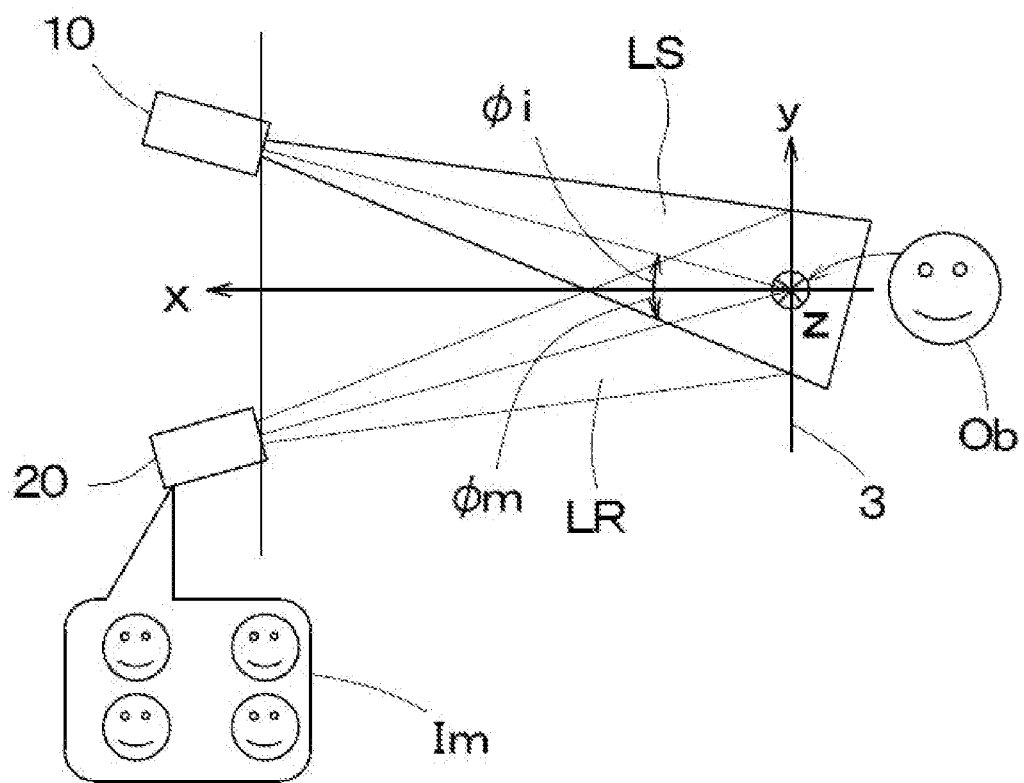
FIG. 5 is an explanatory view of a measurement state of the optical measurement apparatus.

FIG. 5 is an explanatory view of measurement performed by the optical measurement apparatus of Example 1. In order to perform measurement on the subject Ob disposed at the origin of coordinates, the polarized light irradiation unit 10 was disposed at a position where ri=418 mm, θi=0°, and φi=16° in a polar coordinate system, and the polarization imaging unit 20 was disposed at a position where rm=400 mm, θm=0°, and φm=0° in the polar coordinate system. An LED with a central wavelength of 532 nm was used as the light source 11 of the polarized light irradiation unit 10, and a band width was restricted to 532 nm±3 nm by the band-pass filter 22 of the polarization imaging unit 20. The subject Ob was illuminated with 0° linearly polarized light 0LP, and left-handed circularly polarized light LCP as the irradiation light LS from the polarized light irradiation unit 10. In addition, illumination with a fluorescent lamp as natural light, that is, non-polarization illumination was also performed without using the light source 11 for comparison. As the subject Ob, an optical vortex retarder and a resin CD case were used. Imaging corresponding to a polarization state of the measurement light LR was performed by the polarization imaging unit 20, and Stokes parameters were calculated from an imaged image Im.

Figure 6:
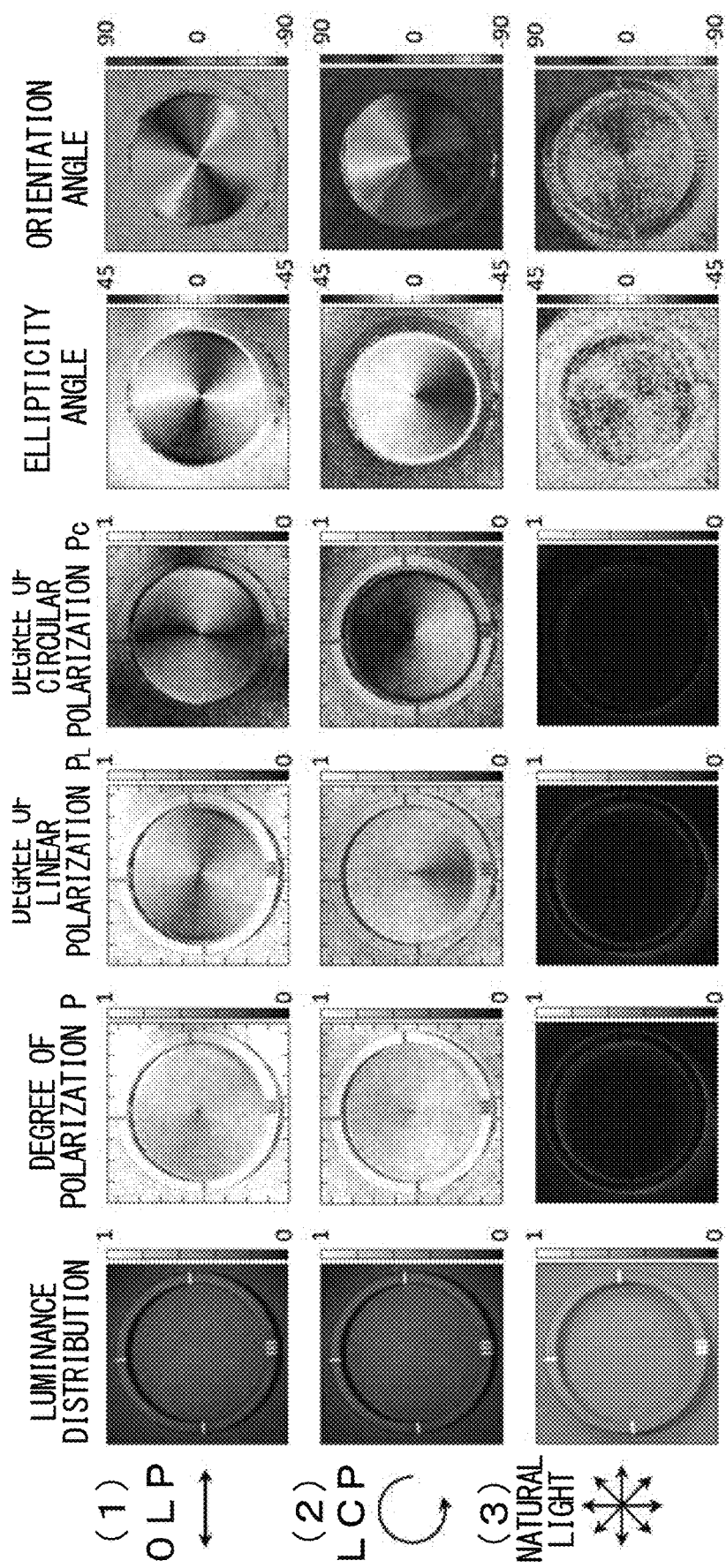
FIG. 6 is an explanatory view of a polarization image obtained by performing measurement on optical vortex retarder.
Figure 7:
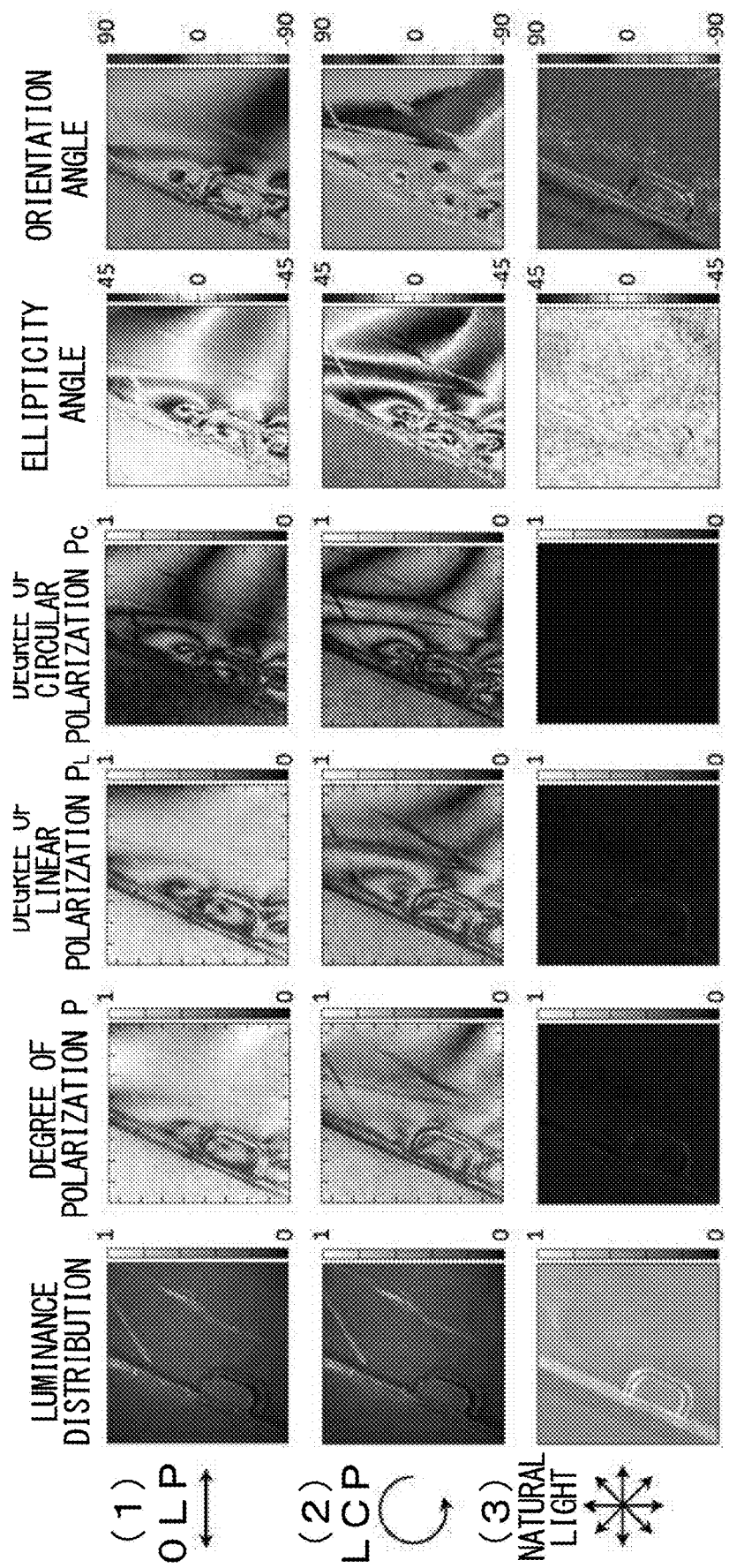
FIG. 7 is an explanatory view of a polarization image obtained by performing measurement on a CD case.

FIG. 6 is an explanatory view of a polarization image obtained by performing measurement on an optical vortex retarder, and FIG. 7 is an explanatory view of a polarization image output from Stokes parameters of a CD case. FIG. 6 and FIG. 7 illustrate a luminance distribution, a degree of polarization, a degree of linear polarization, a degree of circular polarization, an ellipticity angle, and an orientation angle with respect to (1) 0° linearly polarized light 0LP, (2) left-handed circularly polarized light LCP, and (3) natural light. Note that, in calculation, a relationship of the degree of circular polarization=Stokes parameter S3/Stokes parameter S0 is defined.

As illustrated in FIG. 6 and FIG. 7, it could be seen that an image different from a simple luminance distribution obtained by a typical imaging optical system is obtained with respect to any subject Ob, and a contour portion of the subject Ob is highlighted in images of the degree of polarization, and this is effective for extraction of a contour.

Figure 8:
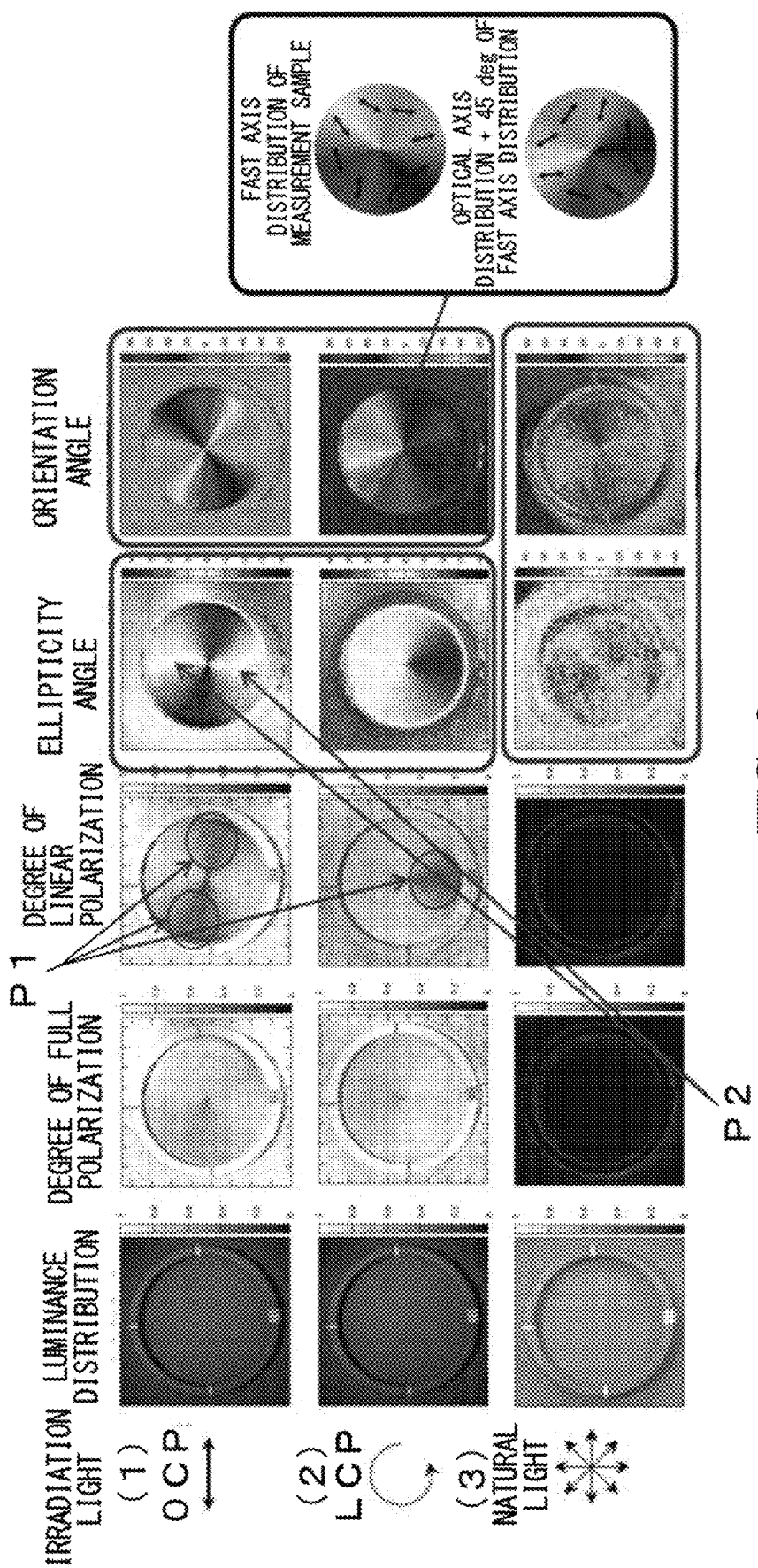
FIG. 8 is a detailed explanatory view of a polarization image obtained by performing measurement on an optical vortex retarder.

FIG. 8 is a detailed explanatory view of a polarization image obtained by performing measurement on an optical vortex retarder. As illustrated in FIG. 8(1), in a case of illumination with linearly polarized light, the orientation angle and the ellipticity angle vary in correspondence with anisotropy of the subject, and thus information of a spatial distribution of anisotropy can be partially visualized. However, as in a feature point P1, in a case where erroneous detection occurs in the degree of polarization, a fast axis and a slow axis of anisotropy cannot be distinguished, and an orientation of linearly polarized light in illumination and an optical axis are parallel or orthogonal to each other, sensitivity disappears as in a feature point P2.

On the other hand, as illustrated in FIG. 8(2), in a case of illumination with circularly polarized light, a direction and a magnitude of anisotropy of the subject can be visualized from the polarization orientation angle and the ellipticity angle. Since the polarization orientation angle is proportional to the optical axis orientation of anisotropy, and sensitivity to all optical-axis orientations is provided, the orientation of the spatial distribution of anisotropy can be accurately recovered as in the feature point P1. Note that, as illustrated in FIG. 8(3), in a case of illumination with natural light, sensitivity to anisotropy is absent.

Figure 9:
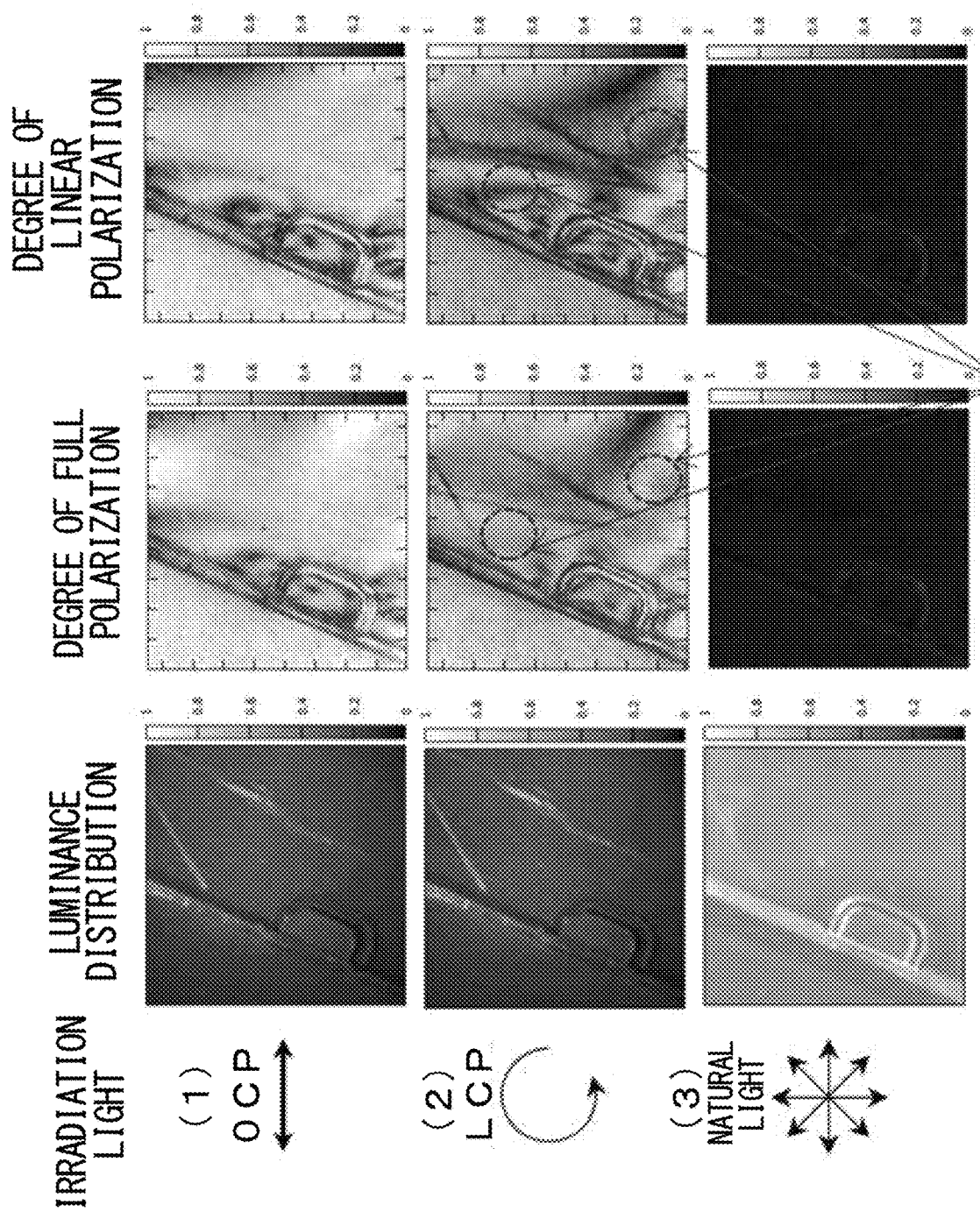
FIG. 9 is a detailed explanatory view of a polarization image obtained by performing measurement on a CD case.

FIG. 9 is a detailed explanatory view of a polarization image obtained by performing measurement on a CD case. As illustrated in FIG. 9(1), in a case of illumination with linearly polarized light, axis selectivity is present in sensitivity to fine anisotropic structure, and a flaw that cannot be detected exists.

On the other hand, as illustrated in FIG. 9(2), in a case of illumination with circularly polarized light, the axis selectivity is small and flaw detection sensitivity is high. In addition, as in a feature point P3, depolarization caused by anisotropy occurs in the degree of linear polarization. In contrast, an influence of depolarization caused by anisotropy can be excluded in the degree of full polarization and accurate depolarization can be measured. Note that, as illustrated in FIG. 9(3), in a case of illumination with natural light, detection sensitivity to a flaw caused by anisotropy is absent.

Figure 10:
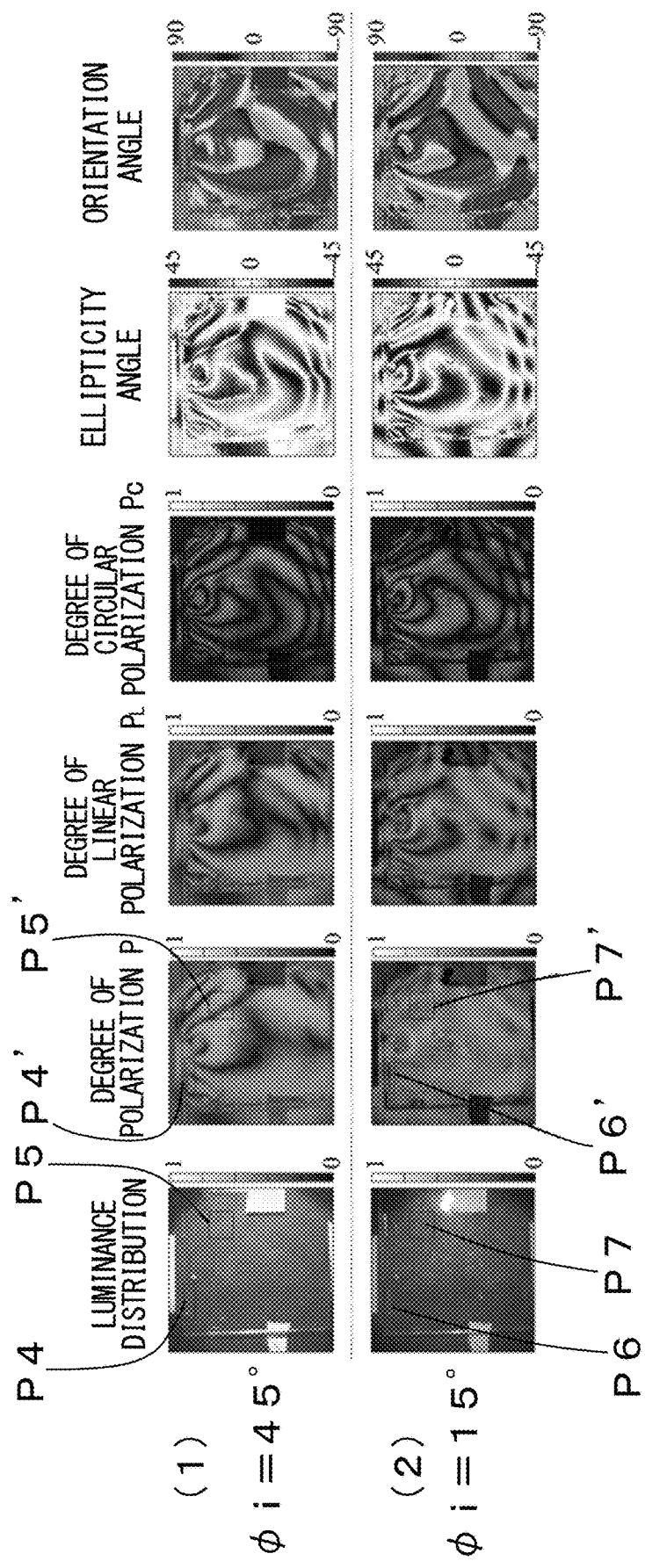
FIG. 10 is an explanatory view of a polarization image measured by changing an irradiation angle of irradiation light.

FIG. 10 is an explanatory view of a polarization image obtained by performing measurement on a CD case by changing an irradiation angle of the irradiation light LS in the polarized light irradiation unit 10, and illustrates measurement results in a case of an irradiation angle φi=45° and 15°. As illustrated in FIG. 10(1), in measurement at the irradiation angle φi=45°, a step difference or a flaw is not clearly detected as in feature points P4 and P5 of a luminance distribution, or feature points P4' and P5' of the degree of polarization. On the other hand, as illustrated in FIG. 10(2), in measurement at the irradiation angle θi=15°, even when viewing feature points P6 and P7 of the luminance distribution, a step difference or a flaw is not clearly detected, but when viewing feature points P6' and P7' of the degree of polarization, it can be seen that a step difference exists at the feature point P6' and a flaw exists at the feature point P7'.

In the optical measurement apparatus of Example 1, the polarized light irradiation unit 10 may include the light source 11, a polarization control unit that controls polarization of the irradiation light LS emitted from the light source 11, and a unit that performs two-dimensional scanning or expansion of the irradiation light LS, and as long as a spatial distribution of a polarization state of the measurement light LR from the subject Ob can be imaged, the polarization imaging unit 20 can employ all existing technologies. For example, the optical measurement apparatus of Example 1 can be constituted by combining any of the first to third polarized light irradiation units 10, 10', and 10" illustrated in FIG. 2A to FIG. 2C, and any of the first to third polarization imaging units 20, 20', and 20" illustrated in FIG. 3A to FIG. 3C, and the above-described measurement can be performed. In addition, when constituting the optical measurement apparatus of the invention by selecting the polarized light irradiation unit 10 and the polarization imaging unit 20 in an appropriate combination from the first to third polarized light irradiation units 10, 10', and 10", and the first to third polarization imaging units 20, 20', and 20" in consideration of a use environment and a measurement target, more satisfactory measurement can also be performed.

Example 2

An optical measurement apparatus of Example 2 has an overall configuration illustrated in FIG. 1 in a similar manner as in the optical measurement apparatus of Example 1, the second polarized light irradiation unit 10' is employed as the polarized light irradiation unit 10, and the first polarization imaging unit 20 is employed as the polarization imaging unit 20.

In measurement performed by the optical measurement apparatus of Example 2, in order to perform measurement on the subject Ob disposed at the origin of coordinates, the second polarized light irradiation unit 10' and the first polarization imaging unit 20 were disposed in a similar manner as in the case of the measurement by Example 1 illustrated in FIG. 5. A semiconductor laser with a central wavelength of 976 nm was used as the light source 11 of the second polarized light irradiation unit 10', a condensing lens was disposed at a front stage of the MEMS mirror 14, and the polarization control element 12 was constituted by a polarization plate and a ¼ wavelength plate and was disposed at a rear stage of the MEMS mirror 14. In addition, the imaging lens 21 of the first polarization imaging unit 20 was disposed at a rear stage of the polarization diffraction grating 25, and the edge-pass filter 22' that shields light with a wavelength of 900 nm or shorter is disposed at a rear stage of the liquid crystal retarders 23 and 24 instead of the band-pass filter 22. Furthermore, as the liquid crystal retarders 23 and 24, liquid crystal retarders designed to operate in a near infrared band were used, as the polarization diffraction grating 25, a polarization diffraction grating which is formed from a polymerizable liquid crystal and of which a phase difference is adjusted for 976 nm was used.

A beam diameter of irradiation light LS' that is laser light with a wavelength of 976 nm which was emitted from the light source 11 of the second polarized light irradiation unit 10' was reduced by the condensing lens. The irradiation light LS' was reflected from MEMS mirror 14 to perform two-dimensional scanning, a polarization state of the irradiation light LS' was controlled from linearly polarized light to circularly polarized light through the polarization control element 12, and the subject Ob was scanned and illuminated with the irradiation light LS' in a rectangular shape. Since the semiconductor laser is used as the light source, and the beam diameter is reduced by the condensing lens, the irradiation light LS' can illuminate a narrow region of the subject Ob with a high light beam density. In addition, since the light source is set to near infrared light, it is less susceptible to an influence of a noise due to external environment light, and an intrusion length into the subject Ob becomes longer in comparison to visible light, information of the subject Ob on a more inner side can be measured.

In order to perform comparison between measurement by polarization illumination of the second polarized light irradiation unit 10' and measurement by non-polarization illumination, measurement was also performed by illuminating the subject Ob with non-polarized irradiation light in a rectangular shape by using a non-polarized light irradiation unit constituted by sequentially arranging an infrared LED, a band-pass filter (a wavelength: 980 nm, and a half width at half maximum: 10 nm), and a rectangular opening instead of the second polarized light irradiation unit 10'.

As described above, a process of acquiring polarized components from the measurement light LR occurred from the subject Ob by illuminating the subject Ob with the irradiation light by performing temporal switching and further spatial separation into two pieces by the imaging lens 21 of the first polarization imaging unit 20, the liquid crystal retarders 23 and 24, and the polarization diffraction grating 25, a process of imaging the polarized components on the imaging element 26 as two images, and a process of calculating Stokes parameters from the images are as described above, and thus description thereof will be omitted. During the processes, a visible-light noise from an external environment with a wavelength of 900 nm or shorter was removed by the edge-pass filter 22' from the measurement light LR that becomes the polarized components obtained through temporal switching by the liquid crystal retarders 23 and 24 and improvement in quality of the acquired polarized components was attempted. As the subject Ob, an optical vortex retarder and a resin CD case were used, imaging corresponding to a polarization state of the measurement light LR was performed by the first polarization imaging unit 20, and Stokes parameters were calculated from imaged images Im.

Figure 11:
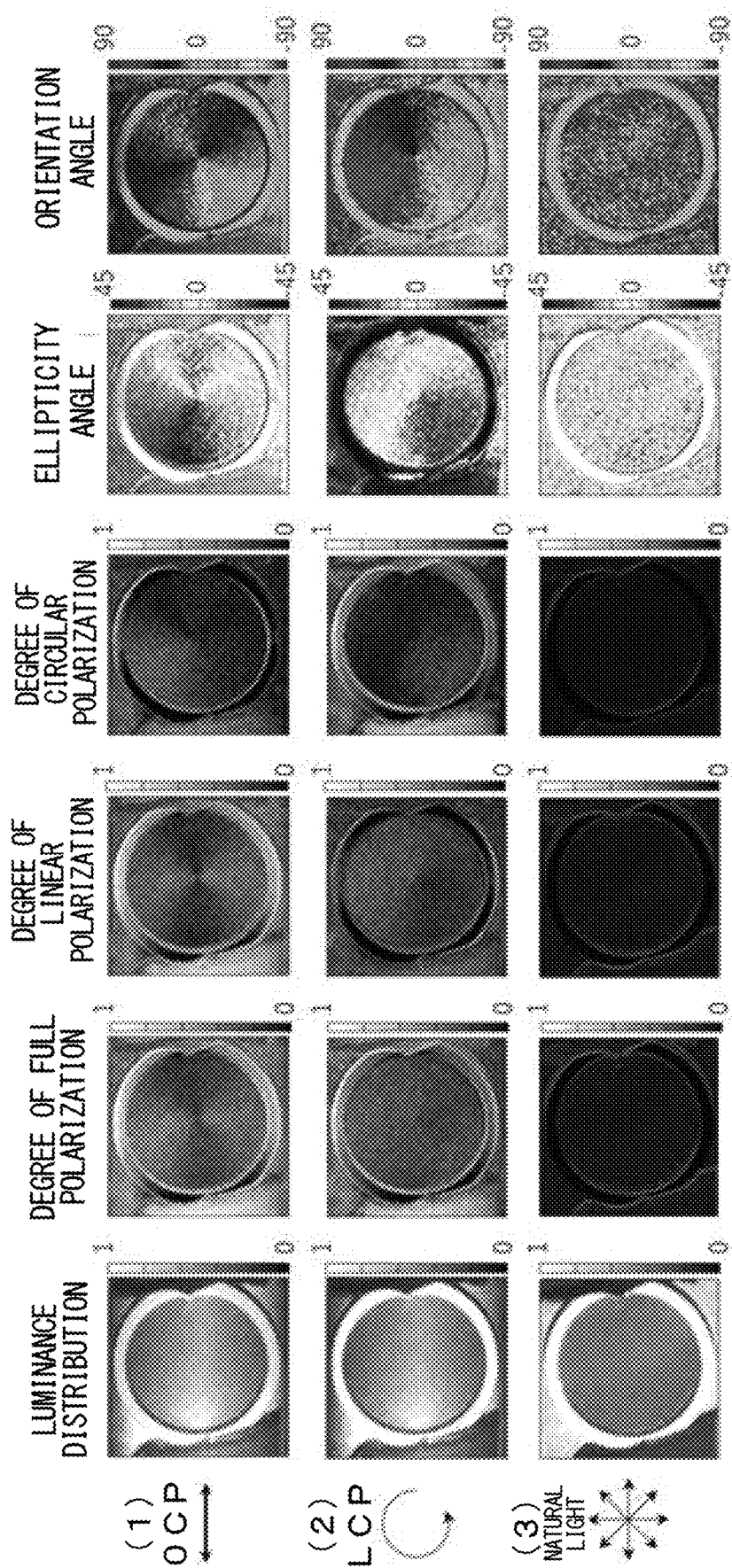
FIG. 11 is an explanatory view of a polarization image obtained by performing measurement on an optical vortex retarder with near infrared light.

FIG. 11 is an explanatory view of a polarization image obtained by measuring measurement light, which occurs due to the optical vortex retarder through polarization illumination of the optical vortex retarder with near infrared light subjected to scanning in a rectangular shape by a semiconductor laser from the second polarized light irradiation unit 10', with the first polarization imaging unit 20 by using the optical measurement apparatus of Example 2, and illustrates a luminance distribution, a degree of full polarization, a degree of linear polarization, a degree of circular polarization, an ellipticity angle, and an orientation angle with respect to (1) 0° linearly polarized light 0LP, (2) left-handed circularly polarized light LCP, and (3) natural light. A polarization image with respect to the (3) natural light is a polarization image measured in a case of performing non-polarization illumination to the optical vortex retarder in a rectangular shape by using the above-described non-polarized light irradiation unit.

It can be seen that the polarization images with respect to the (1) 0° linearly polarized light 0LP and (2) left-handed circularly polarized light LCP subjected to polarization illumination by the second polarized light irradiation unit 10' represent a degree of polarization, an ellipticity angle, and a spatial distribution of an orientation angle which correspond to a spatial distribution of anisotropy of the optical vortex retarder that is the subject Ob, and the anisotropy of the subject Ob can be measured. On the other hand, it can also be seen that in a polarization image with respect to (3) natural light subjected to non-polarization illumination by the non-polarized light irradiation unit, the degree of polarization, the ellipticity angle, and the orientation angle which correspond to the spatial distribution of anisotropy of the optical vortex retarder cannot be measured. From the measurement results, it could be proved that polarization imaging by a combination of the second polarized light irradiation unit 10' including the MEMS mirror 14 and the polarization control element 12, and the first polarization imaging unit 20 including the polarization diffraction grating 25 and the liquid crystal retarders 23 and 24 is effective for measurement of anisotropy of the subject Ob, and polarization imaging by polarization illumination of near infrared light is possible.

Figure 12:
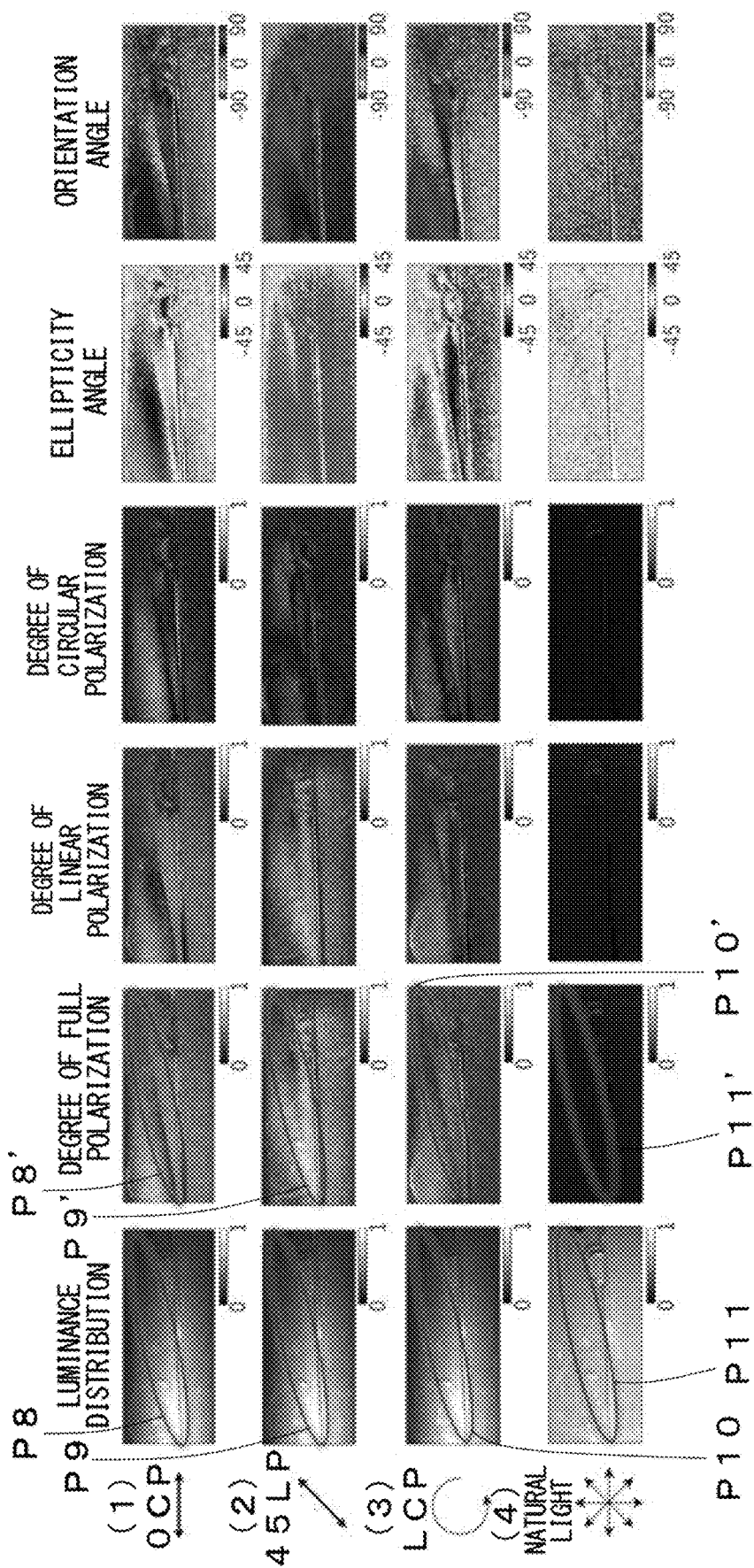
FIG. 12 is an explanatory view of a polarization image obtained by performing measurement on a CD case with near infrared light.

FIG. 12 is an explanatory view of a polarization image obtained by measuring measurement light occurred by a CD case through polarization illumination of the CD case with near infrared light by using the optical measurement apparatus of Example 2, and illustrates a luminance distribution, a degree of full polarization, a degree of linear polarization, a degree of circular polarization, an ellipticity angle, and an orientation angle with respect to (1) 0° linearly polarized light 0LP, (2) 45° linearly polarized light 45 LP, (3) left-handed circularly polarized light LCP, and (4) natural light. Note that, a polarization image with respect to (4) natural light is a polarization image measured in a case of performing non-polarization illumination of the CD case by using the above-described non-polarized light irradiation unit in a similar manner.

In polarization images with respect to (1) 0° linearly polarized light 0LP, (2) 45° linearly polarized light 45 LP, and (3) left-handed circularly polarized light LCP subjected to polarization illumination by the second polarized light irradiation unit 10', it can be seen that a spatial distribution of anisotropy of the CD case that is the subject Ob reflects on the degree of polarization, the ellipticity angle, and the spatial distribution of the orientation angle. On the other hand, in the polarization image with respect to (4) natural light subjected to non-polarization illumination by the non-polarized light irradiation unit, it can also be seen that the degree of polarization, the ellipticity angle, and the orientation angle on which the spatial distribution of anisotropy of the CD case reflects cannot be measured.

In addition, it can be seen that in the polarization images with respect to (1) 0° linearly polarized light 0LP and (3) left-handed circularly polarized light LCP, depolarization caused by fine distortion is visualized as in feature points P8, P8', P10, and P10', but in the polarization images with respect to (2) 45° linearly polarized light 45 LP and (4) natural light, depolarization is not visualized as in feature points P9, P9', P11, and P11'. The reason why a polarization variation does not occur with respect to 45° linearly polarized light is considered because a main optical axis of the fine distortion faces 45° direction. In natural light (non-polarization illumination), since sensitivity to fine distortion is absent originally, and thus an influence of the fine distortion does not reflect on the polarization image.

From the measurement results, it could be proved that polarization imaging by a combination of the second polarized light irradiation unit 10' including the MEMS mirror 14 and the polarization control element 12, and the first polarization imaging unit 20 including the polarization diffraction grating 25 and the liquid crystal retarders 23 and 24 is also effective for visualization of fine stress distortion, and visualization of the fine stress distortion due to polarization illumination with near infrared light is possible. Particularly, since the beam diameter of near infrared laser light is reduced by the condensing lens, and then the near infrared light is reflected from the MEMS mirror 14 and is subjected to two-dimensional scanning, polarization illumination of a narrow region of the subject Ob can be performed with a high light beam density, and internal information in the fine region such as fine stress distortion can be measured.

As described above, according to the optical measurement apparatus according to the invention, the subject Ob is illuminated with the irradiation light LS of which polarization is controlled from the polarized light irradiation unit 10, and polarization states of the measurement light LR which occurred due to scattering, reflection, absorption, and transmission not only on a surface of the subject Ob but also at the inside of the subject Ob are imaged by spatially separating the polarization states in correspondence with polarization by the polarization imaging unit 20, or a plurality of images of the polarization states are temporally imaged by the polarization imaging unit 20, and all Stokes parameters are calculated.

Subject information unique to the subject Ob can be acquired by measuring a variation of the polarized components occurring between the irradiation light LS and the measurement light LR with the calculated Stokes parameters. Examples of the subject information include a surface structure of the subject Ob, particularly, a surface fine structure such as a flaw and a step difference, an internal structure of the subject Ob such as internal optical anisotropy and internal birefringence, and the like.

In addition, in the optical measurement device according to the invention, since the subject is irradiated with irradiation light of which a polarization state is controlled, it is possible to acquire the above-described subject information that is difficult to measure in a case of irradiating the subject with natural light in the related art, that is, non-polarized irradiation light, and it is possible to suppress a noise or a decrease in contrast which occurs in a case of measuring polarization by irradiating the subject with irradiation light of which a polarization state is unstable.

Furthermore, when using circularly polarized light as the irradiation light of which polarization is controlled, it is possible to suppress an occurrence of a speckle noise due to a phase fluctuation such as coherent light, and it is also possible to improve measurement performance under an environment in which rain, fog, or the like exists, that is, measurement performance in scattering factors.

What is claimed is:

1. An optical measurement apparatus, comprising:
a polarized light irradiation unit that irradiates a subject with irradiation light of which polarization is controlled; and
a polarization imaging unit that images a polarization state of measurement light occurring by irradiating the subject with the irradiation light, and measures a variation of a polarized component occurring between the irradiation light and the measurement light;
wherein the irradiation light is partially polarized light having a degree of polarization of 50 to 100% or fully polarized light, and ellipticity of the fully polarized component is 50 to 100%,
the polarization imaging unit includes a polarization imaging mechanism that is capable of calculating, on the basis of a difference between two images including a right-handed circularly polarized component and a left-handed circularly polarized component, at least an element of Stokes parameters which represents a difference between optical intensities of these polarized components among Stokes parameters of the subject, and
the polarization imaging mechanism includes a polarization diffraction grating that spatially separates the incident measurement light into a left-handed circularly polarized component and a right-handed circularly polarized component, and performs calculation of the element of Stokes parameter which represents the difference in optical intensity of the polarized components from a snapshot captured by imaging the subject with a wavelength of 900 nm or more.

2. The optical measurement apparatus according to claim 1,
wherein the polarization imaging mechanism includes first and second liquid crystal retarders and the polarization diffraction grating arranged on a backward side of the first and second liquid crystal retarders, and is capable of calculating all elements constituted by first, second, third, and fourth Stokes parameters of the subject,
the first and second liquid crystal retarders operate to temporally switch three states including a state in which 0° and 90° linearly polarized components are converted into left-handed circularly polarized light and right-handed circularly polarized light, a state in which 45° and 135° linearly polarized components are converted into left-handed circularly polarized light and right-handed circularly polarized light, and a state in which polarization is not converted by temporally switching a phase difference applied to the measurement light,
the first Stokes parameter that is a difference in optical intensity between the linearly polarized components is calculated on the basis of a difference between two images of the 0° linearly polarized component and the 90° linearly polarized component which are converted into the left-handed circularly polarized light and right-handed circularly polarized light,
the second Stokes parameter that is a difference in optical intensity between the linearly polarized components is calculated on the basis of a difference between two images of the 45° linearly polarized component and the 135° linearly polarized component which are converted into the left-handed circularly polarized light and right-handed circularly polarized light,
the third Stokes parameter that is the element of the Stokes parameters which represents a difference in optical intensity of the polarized components is calculated on the basis of a difference between the two images of the right-handed circularly polarized component and the left-handed circularly polarized component without converting the polarization, and
the fourth Stokes parameter that is a total optical intensity is calculated by obtaining the sum of the two images in calculation of the first, second, and third Stokes parameters.

3. The optical measurement apparatus according to claim 1 or 2,
wherein subject information of the subject is acquired on the basis of the variation of the polarized component which is unique to the subject.

4. The optical measurement apparatus according to claim 3,
wherein the subject information is a surface structure or an internal structure of the subject.

5. The optical measurement apparatus according to claim 1 or 2,
wherein the polarized light irradiation unit includes a MEMS mirror or two or more polarization diffraction gratings for performing two-dimensional spatial scanning with the irradiation light of which polarization is controlled.

6. The optical measurement apparatus according to claim 5,
wherein the polarization diffraction gratings of the polarized light irradiation unit and the polarization diffraction grating of the polarization imaging unit are liquid crystal polymer films or liquid crystal cell type polarization diffraction gratings.

7. The optical measurement apparatus according to claim 1 or 2,
wherein the irradiation light is included in a frequency band from visible light to infrared light, and
the polarization imaging unit of the polarization imaging unit is capable of performing polarization imaging of the measurement light within a range of the frequency band from visible light to infrared light.

* * * * *